US009442927B2

(12) United States Patent
Tsirkin (10) Patent No.: US 9,442,927 B2
(45) Date of Patent: Sep. 13, 2016

(54) OFFLINE GENERATION OF COMPRESSED RADIX TREE WITH KEY SEQUENCE SKIP

(71) Applicant: Red Hat Israel, Ltd., Ra'anana (IL)

(72) Inventor: Michael Tsirkin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 193 days.

(21) Appl. No.: 14/272,439

(22) Filed: May 7, 2014

(65) Prior Publication Data

US 2015/0324384 A1   Nov. 12, 2015

(51) Int. Cl.
*G06F 17/30* (2006.01)
(52) U.S. Cl.
CPC ......... *G06F 17/30* (2013.01); *G06F 17/30153* (2013.01); *G06F 17/30327* (2013.01)
(58) Field of Classification Search
CPC ............. G06F 17/30; G06F 17/30961; G06F 17/30153
USPC .................................................. 707/600–899
See application file for complete search history.

(56) References Cited

U.S. PATENT DOCUMENTS

| | | | |
|---|---|---|---|
| 6,067,574 A | 5/2000 | Tzeng | |
| 6,233,574 B1 | 5/2001 | Ladwig et al. | |
| 6,594,655 B2 | 7/2003 | Tal et al. | |
| 6,662,184 B1 | 12/2003 | Friedberg | |
| 7,031,320 B2 | 4/2006 | Choe | |
| 2014/0280172 A1* | 9/2014 | Amir ................. | G06F 17/30598 707/740 |

FOREIGN PATENT DOCUMENTS

| | | |
|---|---|---|
| WO | WO 0122667 A1 | 3/2001 |
| WO | WO 2009078028 A1 | 6/2009 |

OTHER PUBLICATIONS

Cedric Tedeschi, Peer-to-Peer Prefix Tree for Large Scale Service Discovery, Oct. 2, 2008, retrieved on May 6, 2014 from http://hal.archives-ouvertes.fr/docs/00/52/96/66/PDF/PhD2008-06-1.pdf, pp. 1-152.
Roberto Grossi et al., Compressed Suffix Arrays and Suffix Trees with Applications to Text Indexing and String Matching, retrieved on May 6, 2014 from https://kuscholarworks.ku.edu/dspace/bitstream/1808/7177/1/vitter_2005.pdf, pp. 378-407, SIAM J. Comput. vol. 35, No. 2, © 2005 Society for Industrial and Applied Mathematics.
Viktor Leis et al., The Adaptive Radix Tree: ARTful Indexing for Main-Memory Databases, retrieved on May 6, 2014 from http://wwwkemper.informatik.tu-muenchen.de/~leis/papers/ART.pdf; 12 pages.
Suffix Trees, retrieved on May 6, 2014 from http://www.cs.uct.edu/~shzhang/Combio11/lec.pdf , 55 pages.

* cited by examiner

*Primary Examiner* — Isaac M Woo
(74) *Attorney, Agent, or Firm* — Haynes and Boone, LLP (57) ABSTRACT

Systems and methods are disclosed for compressing a radix tree. An example method includes traversing a radix tree including a plurality of containers. The method also includes identifying, based on the traversing, a parent container having a plurality of child containers, each child container including a sequence of elements. The method further includes for one or more child containers of the plurality of child containers, identifying a unique prefix of the sequence of elements included in the respective child container, identifying a remainder sequence after the unique prefix in the sequence of elements, and removing the remainder sequence from the respective child container.

20 Claims, 7 Drawing Sheets

OFFLINE GENERATION OF COMPRESSED RADIX TREE WITH KEY SEQUENCE SKIP

BACKGROUND

The present disclosure generally relates to a radix tree, and more particularly to compressing a radix tree.

A radix tree is a data structure that is used to store data. A radix tree may be useful for constructing associative arrays with keys that can be expressed as strings and typically supports insertion, deletion, and search operations. The insertion operation adds a new string to the radix tree while trying to minimize the amount of data stored. The deletion operation removes a string from the radix tree. A search operation may include an exact lookup of a string, a lookup of a predecessor or successor of the string, or a lookup of all strings with a particular prefix.

BRIEF SUMMARY

This disclosure relates to compressing a radix tree. Methods, systems, and techniques for compressing a radix tree are provided.

According to an embodiment, a method of compressing a radix tree includes traversing a radix tree including a plurality of containers. The method also includes identifying, based on the traversing, a parent container having a plurality of child containers, each child container including a sequence of elements. The method further includes for one or more child containers of the plurality of child containers, identifying a unique prefix of the sequence of elements included in the respective child container, identifying a remainder sequence after the unique prefix in the sequence of elements, and removing the remainder sequence from the respective child container.

According to another embodiment, a system for compressing a radix tree includes a traverser that traverses a radix tree including a plurality of containers and that identifies a parent container having a plurality of child containers, where each child container includes a sequence of elements. The system also includes a compressor that for one or more child containers of the plurality of child containers, identifies a unique prefix of the sequence of elements included in the respective child container, identifies a remainder sequence after the unique prefix in the sequence of elements, and removes the remainder sequence from the respective child container.

According to another embodiment, a non-transitory machine-readable medium includes a plurality of machine-readable instructions that when executed by one or more processors are adapted to cause the one or more processors to perform a method including: traversing a radix tree including a plurality of containers; identifying, based on the traversing, a parent container having a plurality of child containers, each child container including a sequence of elements; for one or more child containers of the plurality of child containers: identifying a unique prefix of the sequence of elements included in the respective child container; identifying a remainder sequence after the unique prefix in the sequence of elements; and removing the remainder sequence from the respective child container.

BRIEF DESCRIPTION OF THE DRAWINGS

The accompanying drawings, which form a part of the specification, illustrate embodiments of the invention and together with the description, further serve to explain the principles of the embodiments. Embodiments of the present disclosure and their advantages are best understood by referring to the detailed description that follows. In the drawings, like reference numbers may indicate identical or functionally similar elements. The drawing in which an element first appears is generally indicated by the left-most digit in the corresponding reference number.

DETAILED DESCRIPTION

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting. Additionally, each of the examples may be combined with other examples that are disclosed in the following disclosure.

A binary tree may store one or more keys. In an example, if the binary tree stores a key that starts with 100 "0"s, the binary tree may have a depth of 100, stretching down to 100 levels. After the first 100 levels, the path may branch out. It may be time consuming to traverse the binary tree following a single path for 100 levels. A radix tree may offer advantages over a binary tree. For example, rather than store a single bit in a container a radix tree may store a sequence of elements in a single container.

Keys stored in the radix tree may have different lengths. To implement such a radix tree, memory to store the radix tree may be dynamically allocated or may be pre-allocated to ensure that sufficient memory is available to store the longest possible key for each container. Dynamically allocating memory and pre-allocating memory for a radix tree may have performance issues. It may be desirable to compress a radix tree that stores one or more keys. The disclosure provides techniques to compress a radix tree.

Unless specifically stated otherwise, as apparent from the following discussion, it is appreciated that throughout the description, discussions utilizing terms such as "receiving", "identifying", "traversing", "determining", "storing", "deleting", and "removing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
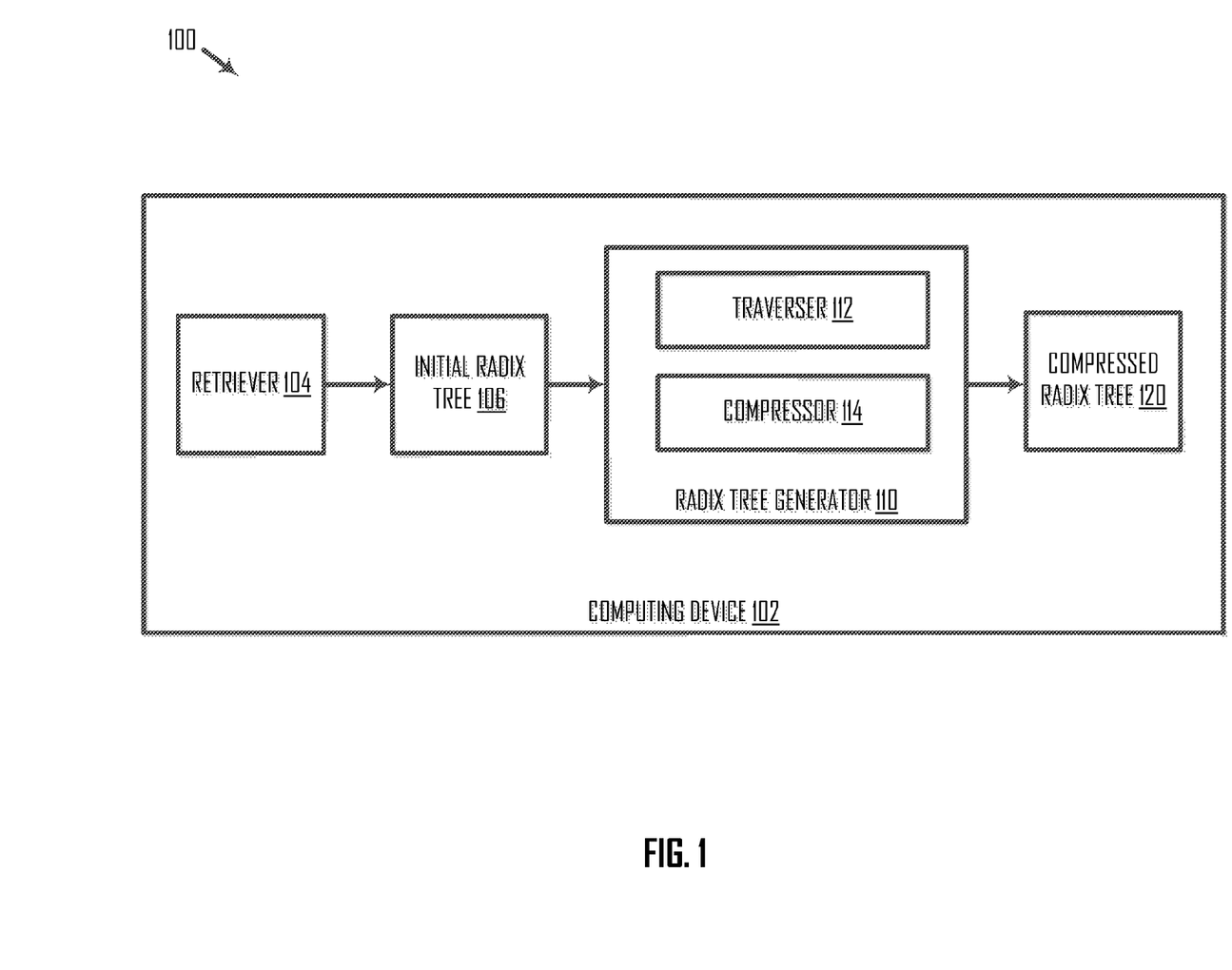
FIG. 1 is a block diagram illustrating a system for compressing a radix tree including a plurality of containers, according to an embodiment.

FIG. 1 is a block diagram 100 illustrating a system for compressing a radix tree including a plurality of containers, according to an embodiment. Diagram 100 includes a computing device 102. Computing device 102 may be a workstation, computer, server, game console, set-top box, kiosk, embedded system, mobile device (e.g., a mobile phone, personal digital assistant, tablet, and laptop), or other device having at least one processor and memory.

FIG. 1 also includes a retriever 104 and a radix tree generator 110. Each of retriever 104 and radix tree generator 110 is executable on computing device 102. Retriever 104 or radix tree generator 110 may receive an instruction to compress an initial radix tree 106. Retriever 104 retrieves initial radix tree 106 stored in memory. A radix tree includes one or more containers and stores one or more keys. Initial radix tree 106 may include containers that have zero or more children. In an example, initial radix tree 106 includes containers that have either zero children or a plurality of children.

A node has a one-to-one relationship with an incoming edge, and the container may be a node or an edge of the radix tree. A key includes a sequence of elements. An element may be, for example, a symbol, character, letter, number, or bit. Other elements are within the scope of the disclosure. The key may map to a value that is referenced by a leaf container in the radix tree. In an example, a key is a sequence of bits that represents an address in memory. In such an example, the key may represent an address supplied in an instruction (e.g., input/output (I/O) address for a port I/O or a physical memory address for memory I/O) that maps to a "target" that indicates the instruction type. In another example, a key is a word including a sequence of letters. In such an example, the radix tree may be used to index words in a text document.

Radix tree generator 110 traverses initial radix tree 106 and compresses it, thereby creating a compressed radix tree 120. In an example, radix tree generator 110 compresses initial radix tree 106 offline. In an example, after the initial radix tree stores the keys and is complete, radix tree generator 110 traverses and compresses the initial radix tree.

Figure 2:
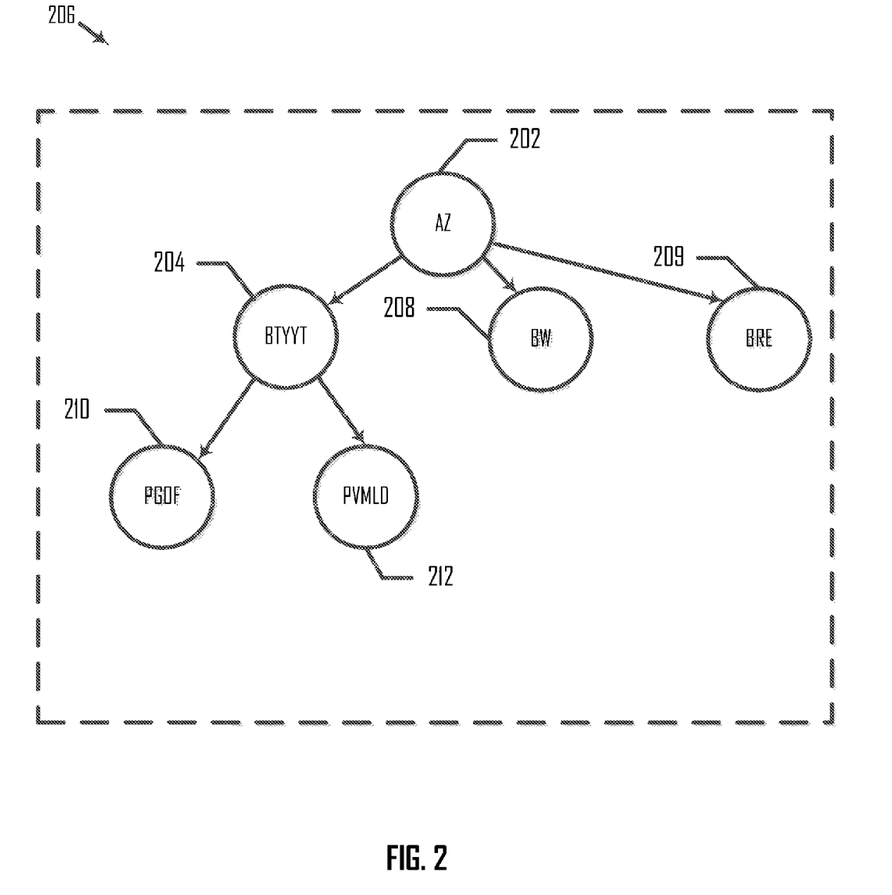
FIG. 2 is a block diagram illustrating an initial radix tree including a plurality of containers, according to an embodiment.

FIG. 2 is a block diagram illustrating an initial radix tree 206 including a plurality of containers, according to an embodiment. In FIG. 2, initial radix tree 206 includes one or more containers and stores one or more keys. Each container in initial radix tree 206 has zero or a plurality of children. Initial radix tree 206 includes a root container 202 that includes a sequence of elements "AZ" and is at a depth of zero in initial radix tree 206.

Root container 202 has three immediate children, containers 204, 208, and 209. Container 204 includes a sequence of elements "BTYYT", container 208 includes a sequence of elements "BW", and container 209 includes a sequence of elements "BRE". Containers 204, 208, and 209 are at a depth of one in initial radix tree 206. An immediate child container of a parent container refers to a direct edge relationship between two containers. The immediate child may be located one depth level below the parent container. In an example, containers 204, 208, and 209 are immediate children of root container 202. An edge connects root container 202 to container 204, which is one depth level below root container 202. In contrast, although container 210 is a descendant of root node 202, container 210 is not an immediate child container of root node 202. An edge does not connect root container 202 to container 210, which is more than one depth level below root container 202. Container 204 has two immediate children, child containers 210 and 212. Container 210 includes a sequence of elements "PGOF", and container 212 includes a sequence of elements "PVMLD". Containers 210 and 212 are at a depth of two in initial radix tree 206. Containers 208-210 and 212 are leaf containers because they have no children.

Initial radix tree 206 may store four keys. In an example, a first key "AZBTYYTPGOF" is stored in containers 202, 204, and 210. Container 210 may map to a value that is associated with the first key (not shown). A second key "AZBTYYTPVMLD" is stored in containers 202, 204, and 212. Container 212 may map to a value that is associated with the second key (not shown). A third key "AZBW" is stored in containers 202 and 208. Container 208 may map to a value that is associated with the third key (not shown). A fourth key "AZBRE" is stored in containers 202 and 209. Container 209 may map to a value that is associated with the fourth key (not shown).

Radix tree generator 110 includes a traverser 112 and a compressor 114. To compress the radix tree, traverser 112 may traverse the radix tree to determine which elements to remove from a container. In an example, traverser 112 starts from the root container, which may or may not store the beginning sequence of elements of the key that is being searched for. In an example, if the sequence of elements stored in the root container matches the first sequence of elements of the key, traverser 112 then looks at the root container's children to search for the next sequence of elements in the searched-for key. Traverser 112 may continue to traverse the radix tree until a leaf container is reached. If a leaf container is not reached, then the key is not stored in the radix tree. If a leaf container is reached, then the key may be stored in the radix tree. Traverser 112 may look in the leaf container to identify a value to which the key maps. A leaf container may be associated with a value to which the key is mapped. The leaf container may identify a value to which the key maps and the value is associated with the key. In an example, the value may be inserted in the leaf container. In another example, the leaf container references or points to the value.

Each container in the initial radix tree may include a sequence of one or more elements. In the example illustrated in FIG. 2, each container in initial radix tree 206 includes a plurality of elements. It may be desirable to minimize the amount of memory that each container in the radix tree consumes. The present disclosure provides techniques to compress initial radix tree 206 such that it consumes less memory per container.

Root container 202 has a plurality of child containers. To search for a key that starts with "AZB", traverser 112 may traverse root container 202 and then container 204, container 208 and/or container 209. Each of containers 204, 208, and 209 includes a sequence of elements having a common prefix "B", and also includes a prefix that is unique from the prefixes in the other child containers. For example, container 204 includes a unique prefix "BT", "BTY", "BTYY" that is different from the prefixes in containers 208 and 209. Similarly, container 208 includes a unique prefix "BW" that is different from the prefixes in containers 204 and 209. Similarly, container 209 includes a unique prefix "BR" that is different from the prefixes in containers 204 and 208.

A prefix may refer to one or more beginning elements of the sequence of elements included in a container. A unique prefix included in a container is different from each of the prefixes of the one or more other child containers of the plurality of child containers of a parent container. To compress initial radix tree 206, compressor 114 may take advantage of containers that are immediate children of the same parent container and that have a unique prefix compared to the other immediate children of the parent container. Additionally, a container may include a remainder sequence. A remainder sequence may refer to a sequence of elements that is after the prefix. For example, if compressor 114 identifies "BT" as the prefix included in container 204, then the remainder sequence is "YYT". In another example, if compressor 114 identifies "BTY" as the prefix included in container 204, then the remainder sequence is "YT".

Retriever 104 or radix tree generator 110 may receive an instruction to compress initial radix tree 206. In response to the instruction, radix tree generator 110 may compress initial radix tree 206 offline. Each container included in initial radix tree 206 may store a sequence of elements that may make up part of a key. In an embodiment, traverser 112 traverses initial radix tree 206 container by container and identifies the sequence of elements included in the one or more traversed containers. Traverser 112 may traverse initial radix tree 206 from top (e.g., root node) to bottom (e.g., a leaf node). Traverser 112 may traverse initial radix tree 206 until all of the containers are traversed, until most containers are traversed, until a particular number of containers are traversed, and/or until containers at a particular depth have been traversed. In an example, initial radix tree 206 may be a compressed radix tree that includes at least one container including more than one element. In such an example, traverser 112 traverses a compressed radix tree that will be further compressed, as will be described in the present disclosure.

In an example, traverser 112 traverses the containers in initial radix tree 206 such that a parent of a given container is traversed before the given container is traversed. In an example, traverser 112 traverses root container 202 down to a child container of the root container and continues to traverse the descendants of that child container until a leaf container is traversed. In such an example, traverser 112 may traverse root container 202, container 204 (a child of root container 202), and leaf container 210 (a descendant and child of container 204). If a container has more than one child, traverser 112 may re-traverse the parent container in order to traverse its one or more child containers. For example, after traversing container 204, traverser 112 may re-traverse root container 202 and continue on to traverse container 208 (a child of root container 202) and any children that container 208 may have. Similarly, traverser 112 may then re-traverse root container 202 and continue on to traverse container 209 and any children that container 209 may have.

In another example, traverser 112 starts at root container 202 at depth zero, goes down the next depth level and traverses each container at that depth level, and continues to go down one depth level at a time and traverse each container at that particular depth level before moving on to the next depth level. In such an example, traverser 112 may start at root container 202 at depth zero, traverse down to each of the containers at depth one (e.g., containers 204, 208, and 209), and traverse down to each of the containers at depth two (e.g., containers 210 and 212). Accordingly, containers having a smaller depth are traversed before containers having a larger depth in initial radix tree 206. In other words, containers that are located closer to the root container are traversed before containers that are located farther from the root container.

Figure 3A:
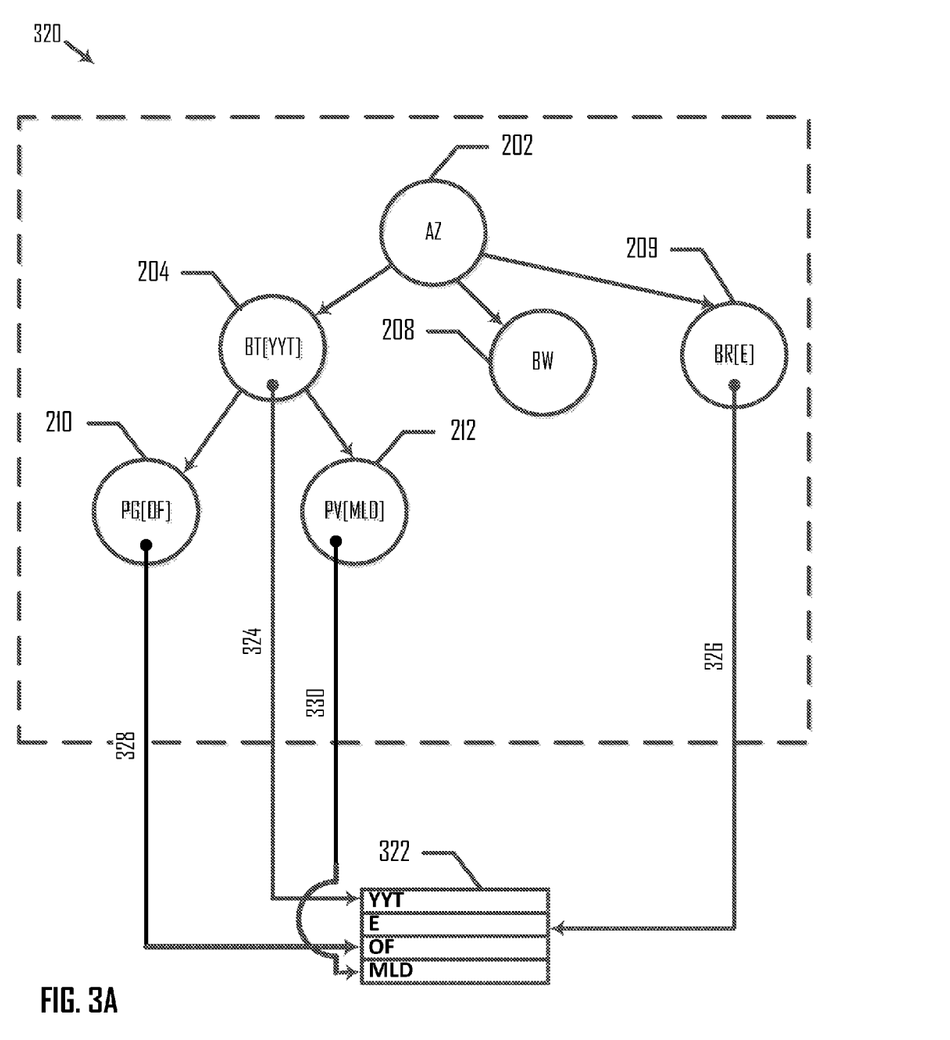
FIG. 3A is a block diagram illustrating a compressed radix tree resulting from the compression of the initial radix tree in FIG. 2, according to an embodiment.

Traverser 112 may identify, based on the traversal, a parent container having a plurality of child containers. In an embodiment, for one or more child containers of the plurality of child containers, compressor 114 identifies a unique prefix of the sequence of elements included in the respective child container, identifies a remainder sequence after the unique prefix in the sequence of elements, and removes the remainder sequence from the respective child container. FIG. 3A is a block diagram illustrating a compressed radix tree 320 resulting from the compression of initial radix tree 206 in FIG. 2, according to an embodiment. The description below will refer to FIGS. 2 and 3 together to explain in further detail how radix tree generator 110 compresses initial radix tree 206 to thereby create compressed radix tree 320.

In an example, traverser 112 identifies root container 202 as having a plurality of child containers, child containers 204, 208, and 209. Container 204 includes a first sequence of elements "BTYYT", container 208 includes a second sequence of elements "BW", and container 209 includes a third sequence of elements "BRE". To compress initial radix tree 206, compressor 114 may identify elements stored in one or more of the child containers to remove. Compressor 114 compares the first, second, and third sequences of elements included in containers 204, 208, and 209. Based on the comparison, compressor 114 identifies a unique prefix in each of the first, second, and third sequences of elements. Although the following description may describe compressor 114 as comparing the sequence of elements included in each of the immediate child containers of a parent, this is not intended to be limiting. For example, in another embodiment, compressor 114 compares the sequence of elements included in two immediate children of a parent node (even when the parent node has more than two immediate children).

Compressor 114 identifies, based on the comparison, a first unique prefix "BTY" included in container 204, a second unique prefix "BW" included in container 208, and a third unique prefix "BRE" included in container 209, where the first, second, and third unique prefixes are each different from each other. The length of the first, second, and third prefixes may be of different lengths. Additionally, each of these containers may include a remainder sequence that is after the prefix in the sequence of elements. Compressor 114 may identify the remainder sequence after the unique prefix in the sequence of elements. For example, if compressor 114 identifies "BTY" as the unique prefix included in container 204, compressor 114 may identify "YT" as the remainder sequence in container 204. Similarly, if compressor 114 identifies "BR" as the unique prefix included in container 209, compressor 114 may identify "E" as the remainder sequence in container 209.

In another example, compressor 114 determines the shortest unique prefixes that are unique within containers 204, 208, and 209. For example, compressor 114 may identify, based on the comparison, a first shortest prefix "BT" included in container 204, a second shortest prefix "BW" included in container 208, and a third shortest prefix "BR" included in container 209. The length of the first, second, and third shortest unique prefixes are of the same length. Additionally, each of these containers may include a remainder sequence that is after the prefix in the sequence of elements. Compressor 114 may identify the remainder sequence after the unique prefix in the sequence of elements. For example, if compressor 114 identifies "BT" as the shortest unique prefix included in container 204, compressor 114 may identify "YYT" as the remainder sequence in container 204. The remainder sequence "YYT" is shown as being enclosed in brackets in FIG. 3A. Similarly, if compressor 114 identifies "BR" as the shortest unique prefix included in container 209, compressor 114 may identify "E" as the remainder sequence in container 209. The remainder sequence "E" is shown as being enclosed in brackets in FIG. 3A.

Compressor 114 removes the remainder sequence from the respective child container. Accordingly, the child container consumes less memory. In an example, compressor 114 removes a remainder sequence from a child container by storing the remainder sequence in an auxiliary data structure, storing a reference from the child container to the auxiliary data structure, and deleting the remainder sequence included in the child container. In another example, a reference already exists from the child container to the auxiliary data structure. In such an example, compressor 114 may remove the remainder sequence from the child container by storing the remainder sequence in an auxiliary data structure, where a reference exists from the respective child container to the auxiliary data structure.

FIG. 3A includes an auxiliary data structure 322 that stores one or more remainder sequences included in a container. Compressor 114 removes one of more remainder sequences from initial radix tree 206 and stores the one or more remainder sequences in auxiliary data structure. A container in the radix tree may reference an entry in the auxiliary data structure, which may be any data structure that is capable of storing a sequence of elements. The auxiliary data structure may be, for example, a table, array, binary tree, or other data structure.

In keeping with the above example in which compressor 114 determines the shortest prefixes that are unique within containers 204, 208, and 209, for container 204, compressor 114 may store the remainder sequence "YYT" in an entry in auxiliary data structure 322 and store a reference 324 from container 204 to auxiliary data structure 322. Similarly, for container 209, compressor 114 may store the remainder sequence "E" in an entry in auxiliary data structure 322 and store a reference 326 from container 209 to auxiliary data structure 322.

Traverser 112 may traverse container 204 and its one or more immediate children. Traverser 112 may identify container 204 as a parent container having a plurality of child containers, containers 210 and 212. Compressor 114 may identify a unique prefix of the sequence of elements included in containers 210 and 212, identify one or more remainder sequences after a unique prefix, and remove one or more of the identified remainder sequences from a container. In an example, compressor 114 compares a first sequence of elements "PGOF" included in container 210 and a second sequence of elements "PVMLD" included in container 212. Compressor 114 identifies, based on the comparison, a unique prefix for each of containers 210 and 212 and may identify one or more remainder sequences in a container. In the example illustrated in FIG. 3A, compressor 114 may identify a unique prefix "PG" and a remainder sequence "OF" (enclosed in brackets) included in container 210, and may also identify a unique prefix "PV" and a remainder sequence "MLD" (enclosed in brackets) included in container 212. The identified prefix "PG" in container 210 is different from the identified prefix "PV" in container 212. Compressor 114 may remove the remainder sequences and store them in auxiliary data structure 322. For example, compressor 114 may remove the remainder sequence "OF" (enclosed in brackets) included in container 210, store the remainder sequence in auxiliary data structure 322, and store a reference 328 from container 210 to auxiliary data structure 322. Similarly, compressor 114 may remove the remainder sequence "MLD" (enclosed in brackets) included in container 212, store the remainder sequence in auxiliary data structure 322, and store a reference 333028 from container 212 to auxiliary data structure 322.

Figure 3B:
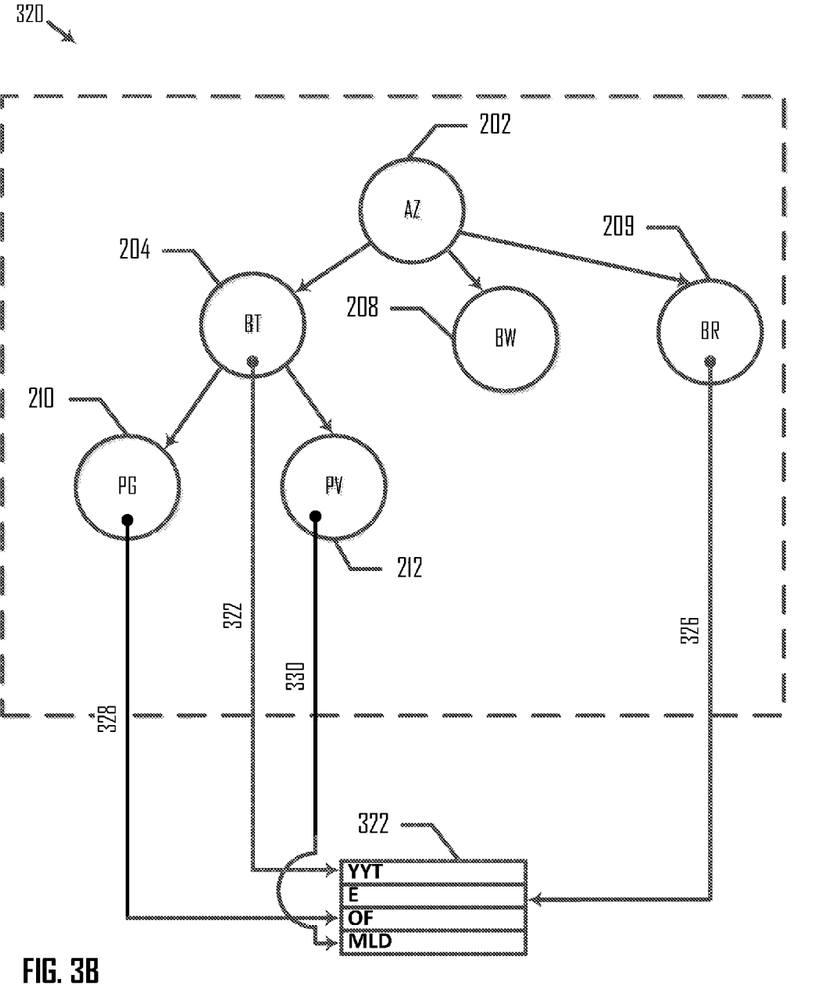
FIG. 3B is a block diagram illustrating the compressed radix tree after the remainder sequences included in the containers have been deleted, according to an embodiment.

Compressor 114 may delete the remainder sequences that are stored in the auxiliary data structure from the container. FIG. 3B is a block diagram illustrating compressed radix tree 320 after the remainder sequences included in the containers have been deleted, according to an embodiment. In FIG. 3B, the remainder sequences that were enclosed in brackets in FIG. 3A have been deleted from the radix tree. For example, container 204 includes five elements in FIG. 3A and includes two elements in FIG. 3B, thus reducing the memory used to store elements in container 204. Similarly, container 209 includes three elements in FIG. 3A and includes two elements in FIG. 3B, thus reducing the memory used to store elements in container 209. Similarly, container 210 includes four elements in FIG. 3A and includes two elements in FIG. 3B, thus reducing the memory used to store elements in container 210. Similarly, container 212 includes five elements in FIG. 3A and includes two elements in FIG. 3B, thus reducing the memory used to store elements in container 212. In sum, compressed radix tree 320 in FIG. 3B stores nine fewer elements than initial radix tree 206 in FIG. 2. Compressor 114 may first store a remainder sequence in auxiliary data structure 322 and then delete the remainder sequence included in the container. In another example, compressor 114 stores the remainder sequence in random access memory (RAM), deletes the remainder sequence included in the container, and stores the remainder sequence (stored in RAM) in auxiliary data structure 322.

Traverser 112 may traverse a container by determining the sequence of elements stored in the container and then following the reference from the container to the appropriate entry in the auxiliary data structure. For example, when traverser 112 traverses container 204, traverser 112 may identify the sequence of elements "BT" and then follow reference 322 stored in container 204 to the entry including the sequence of elements "YYT" in auxiliary data structure 322. Accordingly, traverser 112 may determine the sequence of elements "BTYYT". Auxiliary data structure 322 may be stored in memory that takes a longer time to access compared to the radix tree. Auxiliary data structure 322 may be stored in a memory-efficient way (e.g., array with linear lookup). A traversal of a compressed radix tree is described in U.S. patent application Ser. No. 14/272,445 to Tsirkin et al., filed May 7, 2014, now U.S. Pat. No. 9,396,286, entitled "Lookup with Key Sequence Skip for Radix Tree," which is incorporated herein by reference in its entirely.

Compressor 114 may determine whether a child container is a leaf container. Compressor 114 may perform particular actions based on whether the traversed container is a leaf container. In an example, compressor 114 may remove the remainder sequence only when the child container is not a leaf container. In such an example, when the child container is determined to not be a leaf container, compressor 114 may identify the unique prefix of the sequence of elements included in the respective child container, identify the remainder sequence after the unique prefix in the sequence of elements, and remove the remainder sequence from the respective child container. In contrast, when the child container is determined to be a leaf container, compressor 114 may leave the sequence of elements stored in the leaf container as is. In such an example, the compressed radix tree may include containers 202, 204, and 208 as shown in FIG. 3B, but container 209 includes sequence of elements "BRE", container 210 includes sequence of elements "PGOF", and container 212 includes sequence of elements "PVMLD", and auxiliary data structure 322 includes only the remainder sequence "YYT" (not shown).

In another example, when the child container is determined to be a leaf container, compressor 114 may remove the sequence of elements included in the leaf container, store the sequence of elements in auxiliary data structure 322, and store a reference from the leaf container to auxiliary data structure 322. In such an example, the compressed radix tree may include containers 202, 204, and 208 as shown in FIG. 3B, but containers 209, 210, and 212 no longer store the sequence of elements that they stored in FIG. 3A (not shown). Rather, container 209 stores reference 326, which references an entry including the sequence of elements "BRE" in auxiliary data structure 322, container 210 stores reference 328, which references an entry including the sequence of elements "PGOF" in auxiliary data structure 322, and container 212 stores reference 330, which references an entry including the sequence of elements "PVMLD" in auxiliary data structure 322 (not shown). By moving the sequence of elements stored in a leaf container from the leaf container to auxiliary data structure 322, the memory used to store the radix tree may be greatly reduced.

In another example, when the child container is determined to be a leaf container, compressor 114 may remove the sequence of elements included in the leaf container, store the key in auxiliary data structure 322, and store a reference from the leaf container to auxiliary data structure 322. In such an example, when the respective child container is determined to be a leaf container, compressor 114 stores in auxiliary data structure 322 a full sequence of a key. The full sequence of the key may be identified in accordance with the traversing of the radix tree from a root container of the radix tree to the respective child container. The full sequence of the key may be a combination of the sequence of elements of the leaf container and all of its parent containers (on the path from the root container to the leaf container). The compressed radix tree may include containers 202, 204, and 208 as shown in FIG. 3B, containers 209, 210, and 212 no longer store the sequence of elements that they stored in FIG. 3A (not shown). Rather, container 209 stores reference 326, which references an entry including the full sequence of elements "AZBRE" in auxiliary data structure 322, container 210 stores reference 328, which references an entry including the full sequence of elements "AZBTYYTPGOF" in auxiliary data structure 322, and container 212 stores reference 330, which references an entry including the full sequence of elements "AZBTYYTPVMLD" in auxiliary data structure 322 (not shown). In the previous example, a first key includes the full sequence of elements "AZBRE", a second key includes the full sequence of elements "AZBTYYTPGOF", and a third key includes the full sequence of elements "AZBTYYTPVMLD". By moving the sequence of elements stored in a leaf container from the leaf container to auxiliary data structure 322, the memory used to store the radix tree may be greatly reduced. Additionally, traverser 112 may be able to determine whether a key being searched for is stored in the radix tree.

Although compressor 114 has been described as using an auxiliary data structure, this is not intended to be limiting. In another example, compressor 114 removes a remainder sequence from a child container by deleting the remainder sequence and storing a length of the sequence of elements included in the container, a length of the remainder sequence identified in the container, and/or a length of the prefix identified in the container.

Figure 4:
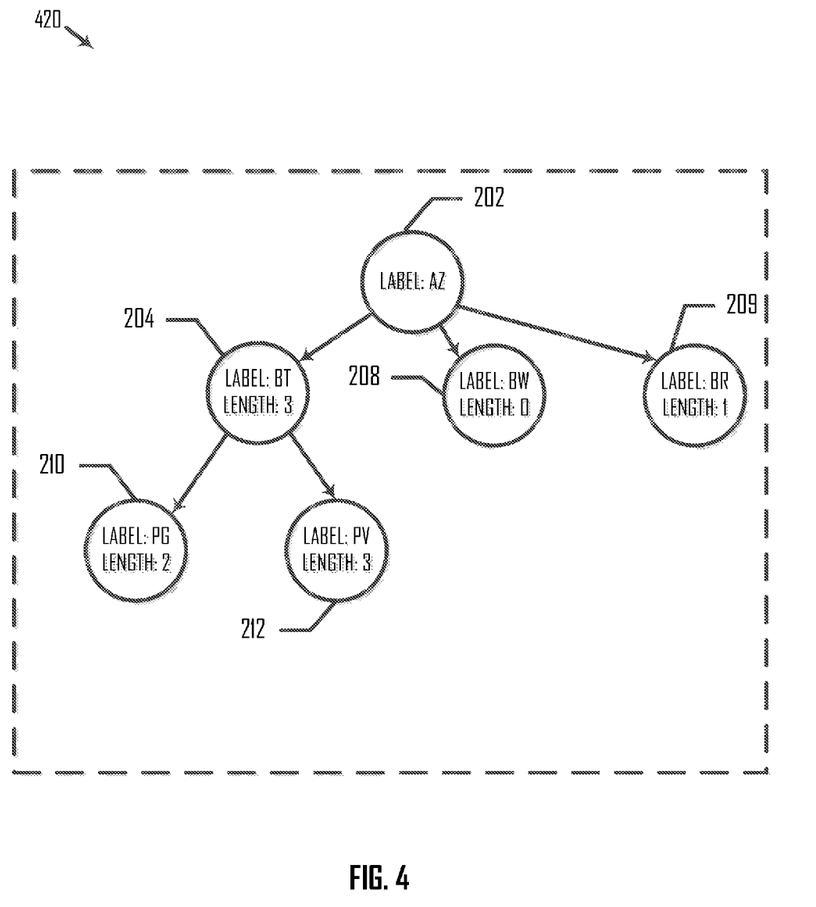
FIG. 4 is block diagram illustrating a compressed radix tree resulting from the compression of the initial radix tree in FIG. 2, according to an embodiment.

FIG. 4 is block diagram illustrating a compressed radix tree 420 resulting from the compression of initial radix tree 206 in FIG. 2, according to an embodiment. In FIG. 4, a container may include a length field that has as its value a length of the remainder sequence identified in the container and may also include a label field that has as its value the prefix identified in the container. In an example, traverser 112 traverses node 202 and identifies container 202 has being a parent container having a plurality of child containers. The plurality of containers includes containers 204, 208, and 209, and each child container includes a sequence of elements. In an example, compressor 114 compares the sequences of elements included in containers 204, 208, and 209 and identifies unique prefixes of the sequences of elements included in the child containers. For example, compressor 114 identifies "BT" as a unique prefix of container 204, identifies "BW" as a unique prefix of container 208, and identifies "BR" as a unique prefix of container 209.

Compressor 114 may also identify a remainder sequence after the unique prefix in the sequence of elements included in a child container, determine a length of the remainder sequence included in the child container, and store the length of the remainder sequence in the respective child container. For example, compressor 114 may identify "YYT" as a remainder sequence after the unique prefix "BT" in container 204 and determine that the length of the remainder sequence is three. Compressor 114 sets container 204's label field value to "BT" and sets container 204's length field value to three, the length of the remainder sequence "YYT" in child container 204. Similarly, compressor 114 may identify "E" as a remainder sequence after the unique prefix "BR" in container 209 and determine that the length of the remainder sequence is one. Compressor 114 sets container 209's label field value to "BR" and sets container 209's length field value to one, the length of the remainder sequence "E" in child container 204.

Compressor 114 may determine that container 208 does not have a remainder sequence because no elements are after the unique prefix "BW" in container 208. Accordingly, compressor 114 may set container 208's label field value to "BW" and set container 208's length field value to zero, the length of the remainder sequence in child container 208. Radix tree generator 110 may continue to perform these actions on containers 210 and 212. As shown, container 210's label field value is set to "PG" and length field value is set to two, the length of the remainder sequence "OF", and container 212's label field value is set to "PV" and length field value is set to three, the length of the remainder sequence "MLD". Compressor 114 removes the identified remainder sequences from the respective child container. Compressed radix tree 420 takes up less memory than initial radix tree 206 in FIG. 2.

Although a container is illustrated as including the length of the remainder sequence, this is not intended to be limiting. For example, in another embodiment, a container may include the length of the sequence of elements included in the container. In such an embodiment, compressor 114 may subtract the length of the prefix from the length of the sequence of elements included in the container to determine the length of the remainder sequence. In another embodiment, a container may also include the length of the prefix identified in the container.

As discussed above and further emphasized here, FIGS. 1, 2, 3A-3B, and 4 are merely examples, which should not unduly limit the scope of the claims. For example, it should be understood that one or more modules may be combined with another module. In an example, traverser 112 may be combined with compressor 114. It should also be understood that a module may be separated into more than one module. In an example, compressor 114 may be separated into a first compressor module and a second compressor module.

Additionally, although the elements have been illustrated in FIGS. 2, 3A-3B, and 4 as being letters, it should be understood that this is not intended to be limiting. Other embodiments in which an element is different from a letter is within the scope of the disclosure. For example, one or more containers may include bits or other symbols.

Figure 5:
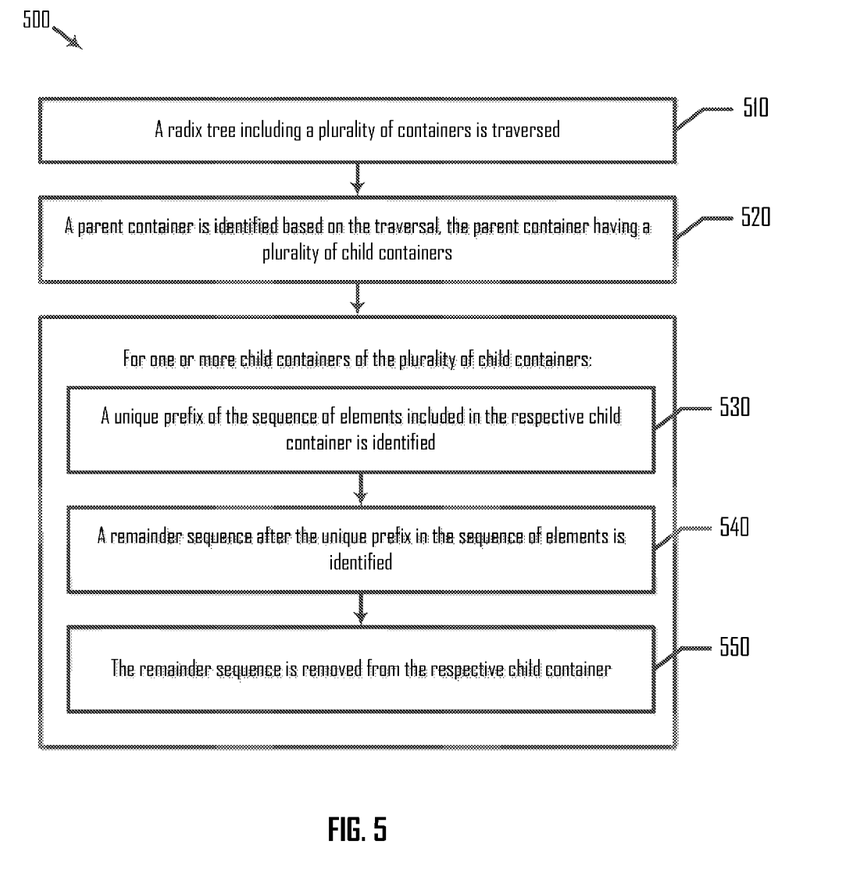
FIG. 5 is a flowchart illustrating a method of compressing a radix tree including a plurality of containers, according to an embodiment.

FIG. 5 is a flowchart illustrating a method 500 of compressing a radix tree including a plurality of containers, according to an embodiment. Method 500 is not meant to be limiting and may be used in other applications.

Method 500 includes actions 510-550. In an action 510, a radix tree including a plurality of containers is traversed. In an example, traverser 112 traverses initial radix tree 206 including containers 202-212. Initial radix tree 206 may store one or more keys or key prefixes. Retriever 104 or radix tree generator 110 may receive an instruction to compress initial radix tree 206. Each container in initial radix tree 206 may store a sequence of elements that make up part of a key.

In an action 520, a parent container is identified based on the traversal, the parent container having a plurality of child containers, each child container including a sequence of elements. In the example illustrated in FIG. 2, traverser 112 identifies, based on the traversing, container 202 as being a parent container having a plurality of child containers, each child container including a sequence of elements. The plurality of child containers includes containers 204, 208, and 209. Container 204 includes a sequence of elements "BTYYT", container 208 includes a sequence of elements "BW", and container 209 includes a sequence of elements "BRE".

For one or more child containers of the plurality of child containers, actions 530-550 are performed. In an action 530, a unique prefix of the sequence of elements included in the respective child container is identified. In an example, compressor 114 identifies a unique prefix "BT" of the sequence of elements "BTYYT" included in child container 204, identifies a unique prefix "BW" of the sequence of elements "BW" included in child container 208, and identifies a unique prefix "BRE" of the sequence of elements "BRE" included in child container 209. A unique prefix is different from each of the prefixes of the one or more other child containers of the plurality of child containers.

In an action 540, a remainder sequence after the unique prefix in the sequence of elements is identified. In an example, compressor 114 identifies a remainder sequence "YYT" after the unique prefix "BT" in the sequence of elements "YYT" included in container 204 and identifies a remainder sequence "E" after the unique prefix "BR" in the sequence of elements "BRE" included in container 209. Compressor 114 may also determine that container 208 does not have a remainder sequence after the unique prefix "BW".

In an action 550, the remainder sequence is removed from the respective child container. In an example, compressor 114 removes the remainder sequence from the respective child container. In an embodiment, compressor 114 removes the remainder sequence from the respective child container by storing the remainder sequence in an auxiliary data structure and storing a reference from the respective child container to the auxiliary data structure (see FIGS. 3A and 3B as an example). In another embodiment, compressor 114 removes the remainder sequence from the respective child container by deleting the remainder sequence, determining a length of the remainder sequence included in the respective child container, and storing the length of the remainder sequence in the respective child container (see FIG. 4 as an example).

It is also understood that additional processes may be performed before, during, or after actions 510-550 discussed above. It is also understood that one or more of the actions of method 500 described herein may be omitted, combined, or performed in a different sequence as desired. In an example, actions 530-550 are applied to one or more (or all) containers at each depth level of a radix tree to compress the radix tree.

Figure 6:
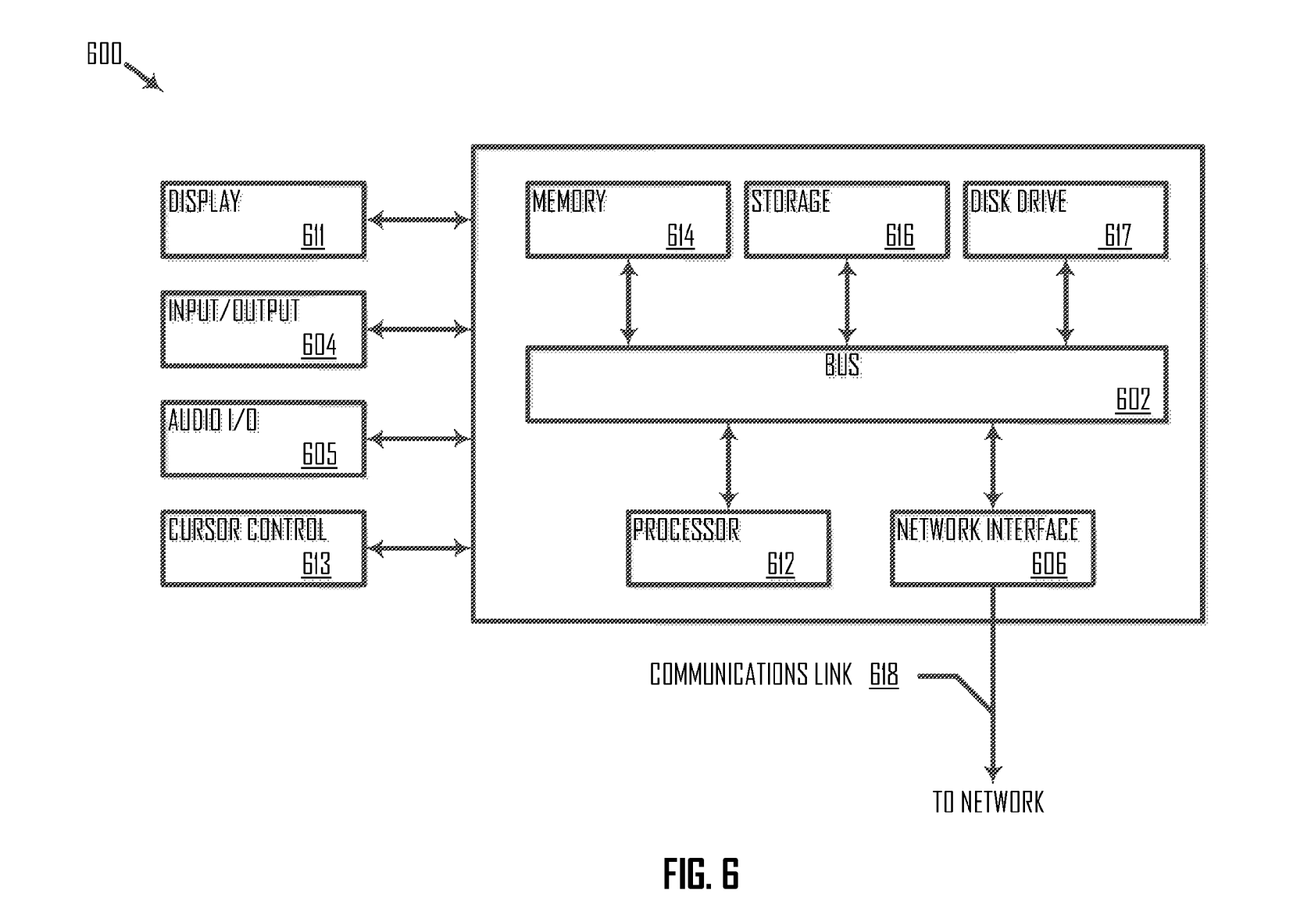
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, computing device 102 may include a client or a server computing device that includes one or more processors and may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a microcontroller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 500) to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more specific purpose computers and/or computer systems, networked and/or otherwise. Where applicable, the ordering of various actions described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A method of compressing a radix tree, comprising:
traversing a radix tree including a plurality of containers;
identifying, based on the traversing, a parent container having a plurality of child containers, each child container including a sequence of elements;
for one or more child containers of the plurality of child containers:
identifying a prefix of the sequence of elements included in the respective child container;
identifying a remainder sequence after the prefix in the sequence of elements, wherein a key includes a sequence of elements included in the parent container and further includes the prefix and remainder sequence included in the respective child container, and the prefix is adjacent to the remainder sequence in the key; and
removing the remainder sequence from the respective child container.

2. The method of claim 1, wherein the prefix is different from each of the prefixes of the one or more other child containers of the plurality of child containers.

3. The method of claim 1, wherein the removing the remainder sequence includes deleting the remainder sequence from the child container.

4. The method of claim 3, further including:
determining a length of the remainder sequence included in the respective child container; and
storing the length of the remainder sequence in the respective child container.

5. The method of claim 1, wherein the removing the remainder sequence includes storing the remainder sequence in an auxiliary data structure, wherein a reference from the respective child container references the auxiliary data structure.

6. The method of claim 1, further including:
determining whether the respective child container is a leaf container; and
when the respective child container is determined to be a leaf container, storing in an auxiliary data structure a full sequence of a key, the full sequence of the key being identified in accordance with the traversing of the radix tree from a root container of the radix tree to the respective child container.

7. The method of claim 1, further including:
determining whether the respective child container is a leaf container, wherein the identifying a prefix, identifying a remainder sequence, and removing the remainder sequence includes when the respective child container is determined to not be a leaf container: identifying the prefix, identifying the remainder sequence, and removing the remainder sequence.

8. The method of claim 1, wherein the plurality of child containers includes a first child container and a second child container, the first child container including a first sequence of elements and the second child container including a second sequence of elements different from the first sequence of elements, the method further including:
comparing the first and second sequences of elements, wherein the identifying a prefix includes identifying, based on the comparing, a first unique prefix of the first sequence of elements and identifying, based on the comparing, and a second unique prefix of the second sequence of elements, the first unique prefix being different from the second unique prefix.

9. The method of claim 8, wherein the identifying a first unique prefix includes identifying a first shortest unique prefix and the identifying a second unique prefix includes identifying a second shortest unique prefix.

10. The method of claim 9, wherein a length of the first shortest unique prefix is the same as a length of the second shortest unique prefix.

11. The method of claim 8 wherein a length of the first unique prefix is different from a length of the second unique prefix.

12. The method of claim 1, wherein the key maps to a value that is referenced by a leaf container in the radix tree.

13. A system for compressing a radix tree, comprising:
a traverser that traverses a radix tree including a plurality of containers and that identifies a parent container having a plurality of child containers, wherein each child container includes a sequence of elements; and
a compressor that for one or more child containers of the plurality of child containers, identifies a prefix of the sequence of elements included in the respective child container, identifies a remainder sequence after the prefix in the sequence of elements, and removes the remainder sequence from the respective child container, wherein a key includes a sequence of elements included in the parent container and further includes the prefix and remainder sequence included in the respective child container, and the prefix is adjacent to the remainder sequence in the key.

14. The system of claim 13, wherein the prefix is different from each of the prefixes of the one or more other child containers of the plurality of child containers.

15. The system of claim 13, wherein the compressor determines a length of the remainder sequence included in the respective child container and stores the length of the remainder sequence in the respective child container.

16. The system of claim 13, wherein the compressor stores the remainder sequence in an auxiliary data structure, wherein a reference from the respective child container references the auxiliary data structure.

17. The system of claim 13, wherein the compressor determines whether the respective child container is a leaf container, and when the respective child container is determined to not be a leaf container, the compressor identifies the prefix, identifies the remainder sequence, and removes the remainder sequence.

18. The system of claim 13, wherein the plurality of child containers includes a first child container and a second child container, the first child container includes a first sequence of elements and the second child container includes a second sequence of elements different from the first sequence of elements, and wherein the compressor compares the first and second sequences of elements, identifies, based on the comparison, a first unique prefix of the first sequence of elements, and identifies, based on the comparison, a second unique prefix of the second sequence of elements, and wherein the first unique prefix is different from the second unique prefix.

19. The system of claim 18, wherein the radix tree is a compressed radix tree, and wherein the compressor identifies a first shortest unique prefix and a second shortest unique prefix, and a length of the first shortest unique prefix is the same as a length of the second shortest unique prefix.

20. A machine-readable medium comprising a plurality of machine-readable instructions that when executed by one or more processors is adapted to cause the one or more processors to perform a method comprising:
traversing a radix tree including a plurality of containers;
identifying, based on the traversing, a parent container having a plurality of child containers, each child container including a sequence of elements;
for one or more child containers of the plurality of child containers:
identifying a prefix of the sequence of elements included in the respective child container;
identifying a remainder sequence after the prefix in the sequence of elements, wherein a key includes a sequence of elements included in the parent container and further includes the prefix and remainder sequence included in the respective child container, and the prefix is adjacent to the remainder sequence in the key; and
removing the remainder sequence from the respective child container.

* * * * *